US005699735A

United States Patent [19]

Stein et al.

[11] Patent Number: 5,699,735

[45] Date of Patent: Dec. 23, 1997

[54] WEB-FED ROTARY PRESS

[75] Inventors: Götz Stein, Bolligen; Noel McEvoy, Ittigen; Ernst Lehmann, Hinterkappelen; Marcello Tarchini, Bern, all of Switzerland

[73] Assignee: Maschinenfabrik WIFAG, Bern, Switzerland

[21] Appl. No.: 538,552

[22] Filed: Oct. 3, 1995

[30] Foreign Application Priority Data

Oct. 4, 1994 [DE] Germany .......................... 44 35 429.0

[51] Int. Cl.$^6$ ................................ B41F 5/04; G06F 15/46

[52] U.S. Cl. .......................... 101/219; 101/220; 101/221; 101/247; 364/469; 493/405

[58] Field of Search .................................... 101/219, 220, 101/221, 248, 247, 225; 318/6; 364/469; 493/405, 416, 424

[56] References Cited

U.S. PATENT DOCUMENTS

| | | | |
|---|---|---|---|
| 3,326,487 | 6/1967 | Huck | 242/64 |
| 4,151,594 | 4/1979 | Stern | 364/469 |
| 4,384,522 | 5/1983 | Ehlers et al. | 101/247 |
| 4,423,681 | 1/1984 | Smith | 101/221 |
| 4,538,517 | 9/1985 | Michalik et al. | 101/219 |
| 4,696,229 | 9/1987 | Bezler et al. | 101/177 |
| 4,815,377 | 3/1989 | Skiera | 101/220 |
| 4,945,293 | 7/1990 | Wittkopk et al. | 318/6 |
| 5,179,899 | 1/1993 | Burger et al. | 101/221 |
| 5,363,762 | 11/1994 | Belanger | 101/219 |
| 5,383,393 | 1/1995 | Ueda et al. | 101/220 |
| 5,413,039 | 5/1995 | Sohma | 101/219 |
| 5,417,642 | 5/1995 | Boronka et al. | 493/425 |
| 5,429,051 | 7/1995 | Laubscher | 101/219 |
| 5,483,887 | 1/1996 | Grosshauser | 101/221 |

FOREIGN PATENT DOCUMENTS

| | | |
|---|---|---|
| 0 401 655 | 5/1990 | Germany . |
| 0 452 704 | 3/1991 | Germany . |
| 0 453 862 | 4/1991 | Germany . |
| 4405658A1 | 2/1994 | Germany . |
| 4413663A1 | 4/1994 | Germany . |
| 632 703 | 12/1977 | Switzerland . |

OTHER PUBLICATIONS

Dieter Koch, 1972, Steuerung Elner Offset–Rotationsmaschine, *BBC Brown Boveri.*

1993, Massgeschneidert Fü Ditterenzierte Druckauftrage, *Der Polygraph.*

Karl Thomesen, Jun. 1970, Systematische Überlegungen Zum Gegenwartigen Stand Des Rollenoffsetdrucks, *Offsetdruck.*

*Primary Examiner*—Eugene H. Eickholt

*Attorney, Agent, or Firm*—McGlew and Tuttle

[57] ABSTRACT

A web-fed rotary press has an adjustable reel changer for accommodating printing material webs of different widths, a printing couple with printing cylinders, which can be engaged with one another to form printing stations, and an adjustable folder. The width of the reel changer and the positions of the printing cylinders and of components of the folder are adjusted automatically and in a mutually coordinated manner during the run of the press for changing over the production from a first printed product to a second printed product.

18 Claims, 12 Drawing Sheets

WEB-FED ROTARY PRESS

FIELD OF THE INVENTION

The invention relates to printing in general and more particularly to the changeover of a rotary printing press from one product to another.

BACKGROUND OF THE INVENTION

The changeover of a rotary printing press from one printed product to another is of increasing significance in view of the increasing variety of printed products. The regionalization of newspapers has led to an increased need to provide a multiregional newspaper with regional sections, which may have a different number of pages from one region to the next. However, the newspapers themselves are printed in the same printing plant.

For the necessary change of the printing production, e.g., because of the different number of pages in the printed products, conventional rotary printing presses must be slowed down, stopped, changed over and speeded up for printing the new printed product, e.g., with a changed number of pages.

SUMMARY AND OBJECTS OF THE INVENTION

The primary object of the present invention is to provide a web-fed rotary press, whose operation can be adapted to the changeover from one printing production to another as flexibly as possible.

According to the invention, a web-fed rotary press is provided with an adjustable reel changer for accommodating the printing material webs of different widths. Printing cylinders are provided which can be engaged with one another in a printing couple for forming printing stations. An adjustable folder is provided. Automatic changing means are provided for adjusting the width of the reel changer, the position of the said printing cylinders and components of the said folder in a mutually coordinated manner during the run of the press to change over the production from a first printed product to a second printed product.

Essential components of the press, namely, a reel changer, and a folder of the web-fed rotary press, are automatically adjustable according to the present invention during the running of the press. Thus, the entire web-fed rotary press is affected by the adjustment according to the present invention, rather than only one of these components of the press. The change of the printing production during the running of the press is made possible only by the suitable adjustment of all components of the press which are necessary for the production. The press does not have to be stopped any more for this purpose.

The automatic adjustment of individual components of the press is generally known in the state of the art. An adjustable reel changer is taught, e.g., by U.S. Pat. No. 3,326,487 (which is hereby incorporated by reference), a flying plate changer is taught by DE35 10 822 C1 and the corresponding U.S. Pat. No. 4,696,229 (which is hereby incorporated by reference), and a folder with adjustable folding jaw is taught by DE42 15 911 A1 and the corresponding U.S. Pat. No. 5,417,642 (which is hereby incorporated by reference).

Due to the printing press according to the present invention having a reel changer, which is able to accommodate printing material webs of different width, and due to the components of the press arranged downstream of it, especially the printing cylinders and the folder, being correspondingly adjustable, the printing press is especially suitable for fully automatic changeover during the production of the first printed product to the production of a second printed product with the number of pages changed compared with that of the first printed product.

Due to the printing material web being passed through more printing stations than necessary for a current production, it is possible to put into operation previously unused printing stations at the time of the changeover of the production, while printing stations no longer necessary for a new production are put out of operation. The sites of the printing press at which a printing material web can or could be printed on are called printing stations. The printing material web is therefore to be guided by the printing press such that printing stations not needed for a current production can be switched on when needed and other printing stations, which are not needed for the new production after the changeover, can be correspondingly switched off.

A compatible arrangement of printing and form or plate cylinders which is especially suitable for the purposes of the present invention is disclosed in the German Patent Application No. P44 05 658.3, which was not published before the priority date. This arrangement is formed by directly driven cylinder groups. These cylinder groups comprise at least one printing cylinder and one plate cylinder. The printing cylinder and the plate cylinder are mechanically coupled with one another in pairs and are driven by a separate drive motor, mechanically independently from other cylinder groups formed in the same manner. This design of integrating cylinders in pairs makes possible the flexible switching on and off of the cylinder groups during the running operation of the printing press. The registering of cylinder groups newly switched on is not performed via a mechanical longitudinal shaft, but via a corresponding electronic control unit, which is particularly advantageous for the purposes of the present invention.

The directly driven cylinder groups can be engaged with a common counterpressure cylinder or with another, directly driven cylinder group in order thus to make possible the flexible formation of printing stations.

The arrangement in pairs of two directly driven cylinder groups symmetrically on both sides of a printing material web passing through between the printing cylinders of the two groups is particularly preferred. A plurality of such pairs of cylinder groups forms a printing tower of the printing press according to the present invention. For example, four pairs of such cylinder groups are needed for a four-color newspaper printing. To carry out the changeover during the press run, the printing press has additional pairs of cylinder groups according to the present invention, which would not be necessary for a single production. The printing material web is passed through all pairs of cylinder groups. Pairs of cylinder groups, which are different from one production to the next, are always operating, while the other pairs of cylinder groups are out of operation. The press configuration can thus be changed flexibly by putting the pairs of cylinder groups needed in the preceding production out of operation and putting into operation preinstalled pairs of cylinder groups corresponding to the new printed product.

Besides the rapid, time-saving changeover of production, the amount of waste paper caused by the changeover of production can be reduced compared with prior-art presses.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
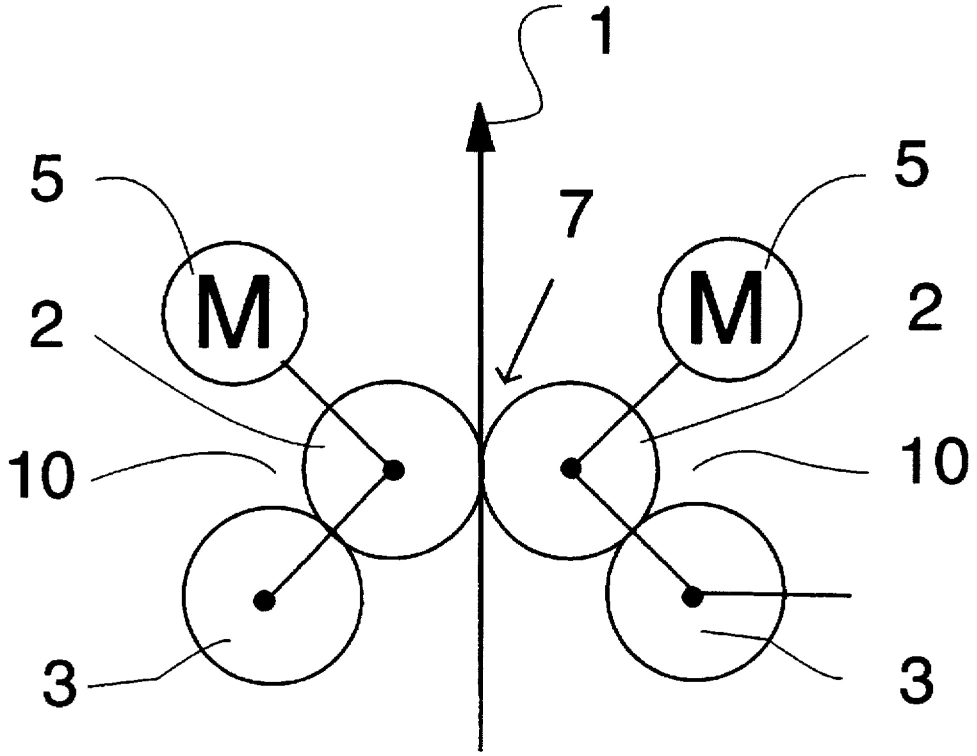
FIG. 1 is a schematic view of a printing station with two cylinder groups.

In a printing station shown in FIG. 1, a paper web 1 to be printed on is passed through the two blanket cylinders 2 located opposite each other (also called printing cylinders 2 because of their function) of two cylinder groups 10. The two cylinder groups 10 are formed by a printing cylinder 2 and an associated plate cylinder 3 each, which are mechanically coupled with one another for common direct drive. The mechanical coupling is schematically indicated by a connection line between the centers of the two cylinders 2 and 3.

The printing cylinders 2 of each cylinder group 10 are driven by a three-phase motor 5 in the exemplary embodiment. The configuration corresponding to FIG. 1, in which only one printing cylinder 2 and one plate cylinder 3 are integrated by a mechanical coupling to form a cylinder group 10, is characterized by a simple design and the highest possible degree of freedom of configuration in the formation of printing stations or printing station groups. The cylinder groups 10 thus designed are also especially suitable for forming changing printing stations because of their direct drive.

Figure 2:
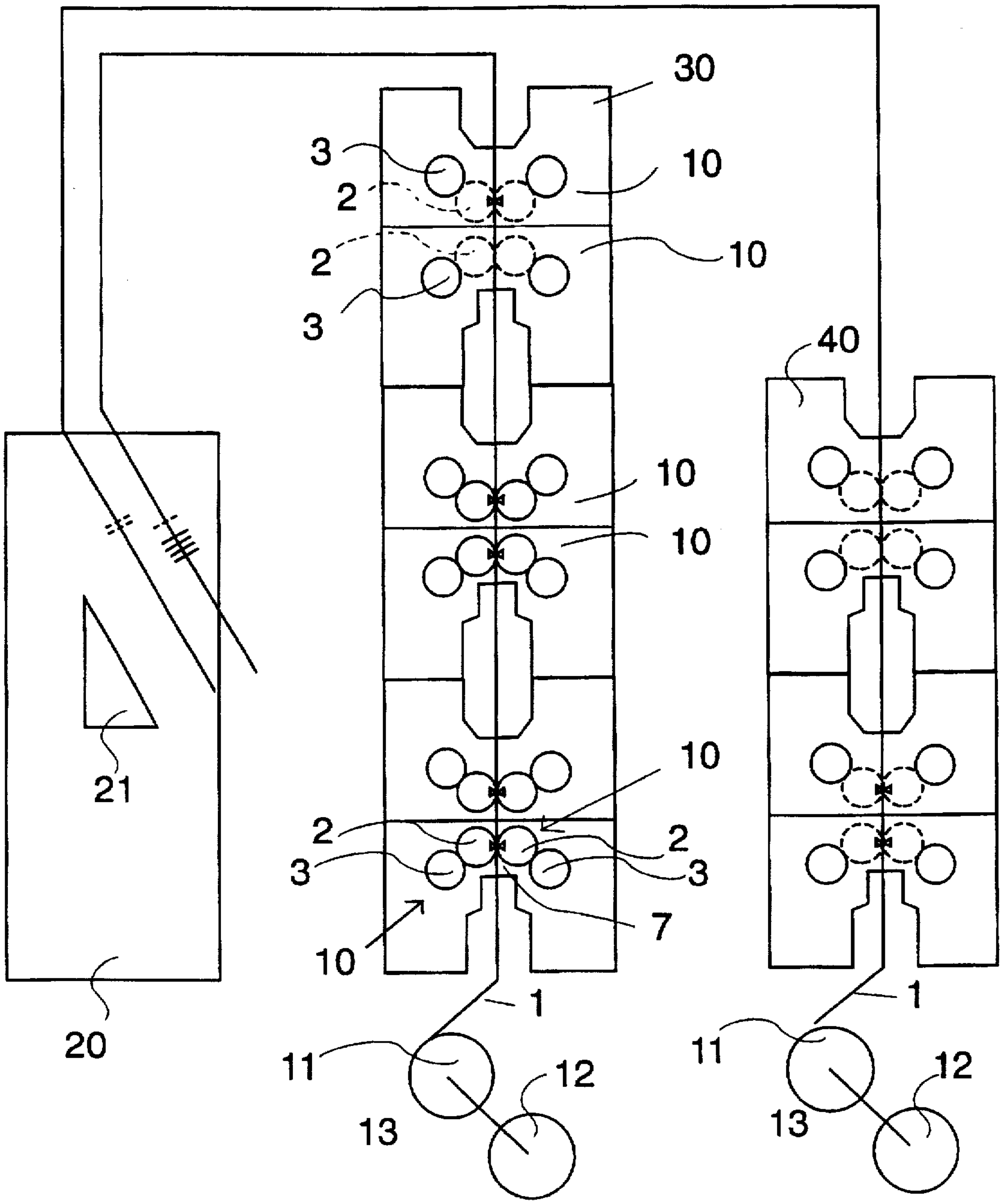
FIG. 2 is a schematic view of a printing press with printing towers, which are each formed by a plurality of cylinder groups according to FIG. 1.

FIG. 2 shows a first exemplary embodiment of a web-fed rotary press according to the present invention, whose printing stations are formed by pairs of cylinder groups 10 according to FIG. 1. A printing material web 1 is wound off from a reel 11 of a reel or roll changer 13, and it runs into a printing tower 30 at a first printing station 7. The printing tower 30, designed as a 12-cylinder tower, has six pairs of cylinder groups 10, whose printing cylinders 2 can be engaged with one another to form a printing station 7. In the operating state shown, the first four pairs of cylinder groups 10 of the printing tower 30 form one printing station 7, so that the printing material web 1 is printed in four-color printing on the front and back sides. The printing material web 1 also passes through two pairs of printing cylinders 2, which are not located in their printing positions. The printing cylinders 2 of these latter two printing stations are correspondingly shown by broken lines.

The cylinder groups 10 are arranged in pairs in the form of an upright or upside-down "V," wherein cylinders arranged as an upright "V" (or "U" shape) is always arranged above cylinders arranged as a "V" turned upside down. Such an upside down "V" shaped group of cylinders is also referred to herein as a "n" shaped group of cylinders and a "V" shaped group of cylinders may also be considered "U" shaped. The shape can best be appreciated from viewing the cylinder groups 10 of FIG. 2. As a result, two pairs of cylinder groups form a bridge form or the form of a horizontal "H." This has the advantage that the printing stations formed by two adjacent pairs of cylinder groups 10 are located close to one another, as a result of which the fan-out effect can be kept low, because penetrating moisture between the printing stations has little time for diffusing in.

Another printing material web 1 from another reel changer 13 passes through a second printing tower 40, which is arranged as an eight-cylinder printing tower in the exemplary embodiment. The webs 1 printed in the two printing towers 30 and 40 are led into a former 21 of a folder 20 through a press projection and over turning bars.

Figure 5A:
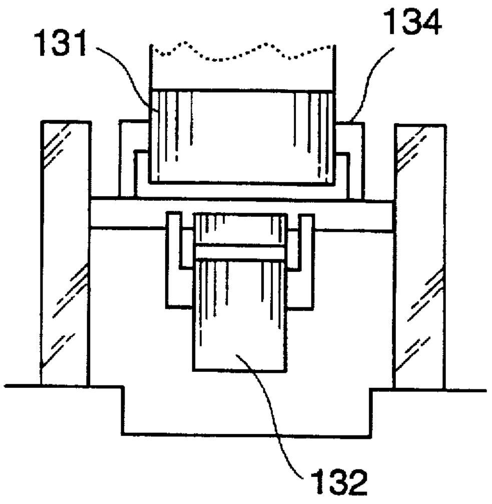
FIG. 5a (PRIOR ART)
FIG. 5*a* is a schematic front view of a roll changer with centered arrangement of paper rolls of unequal roll width.
Figure 5B:
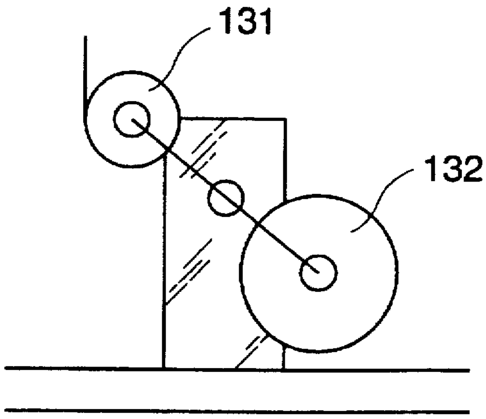
FIG. 5b (PRIOR ART)
FIG. 5*b* is a schematic side view of the roll changer of FIG. 5*a;*

To change over the production, e.g., from a first printed product to a second printed product comprising a reduced number of pages, a new paper reel, which has a smaller width, as shown in FIGS. 5*a* and 5*b*, than the preceding paper reel, is clamped into one of the two reel changers 13 of the printing towers 30 or 40 or into both reel changers 13. The reel is changed fully automatically in the known manner as disclosed in for example U.S. Pat. No. 3,326,487.

To change an ink or the contents of a printed product, a new printing station 7 is formed by the printing cylinders 2 of one of the two upper pairs of cylinder groups of the printing tower 30 and/or of the printing tower 40, which printing cylinders were not engaged (e.g. as shown in broken lines) with each other before. One of the pairs of cylinder groups in operation before in the lower part of the printing tower 30 or of the printing tower 40 is correspondingly put out of operation by pivoting the corresponding cylinder groups 10 away from each other.

The folder 20 is correspondingly adjusted at the time of the changeover of the printing production to a new printed product with changed number of pages. To do so, the distance between the reels of reel pain, which are not shown and are arranged downstream of the former 21, is adjusted, and thus adapted to the changed number of pages of the new printed product.

Figure 3:
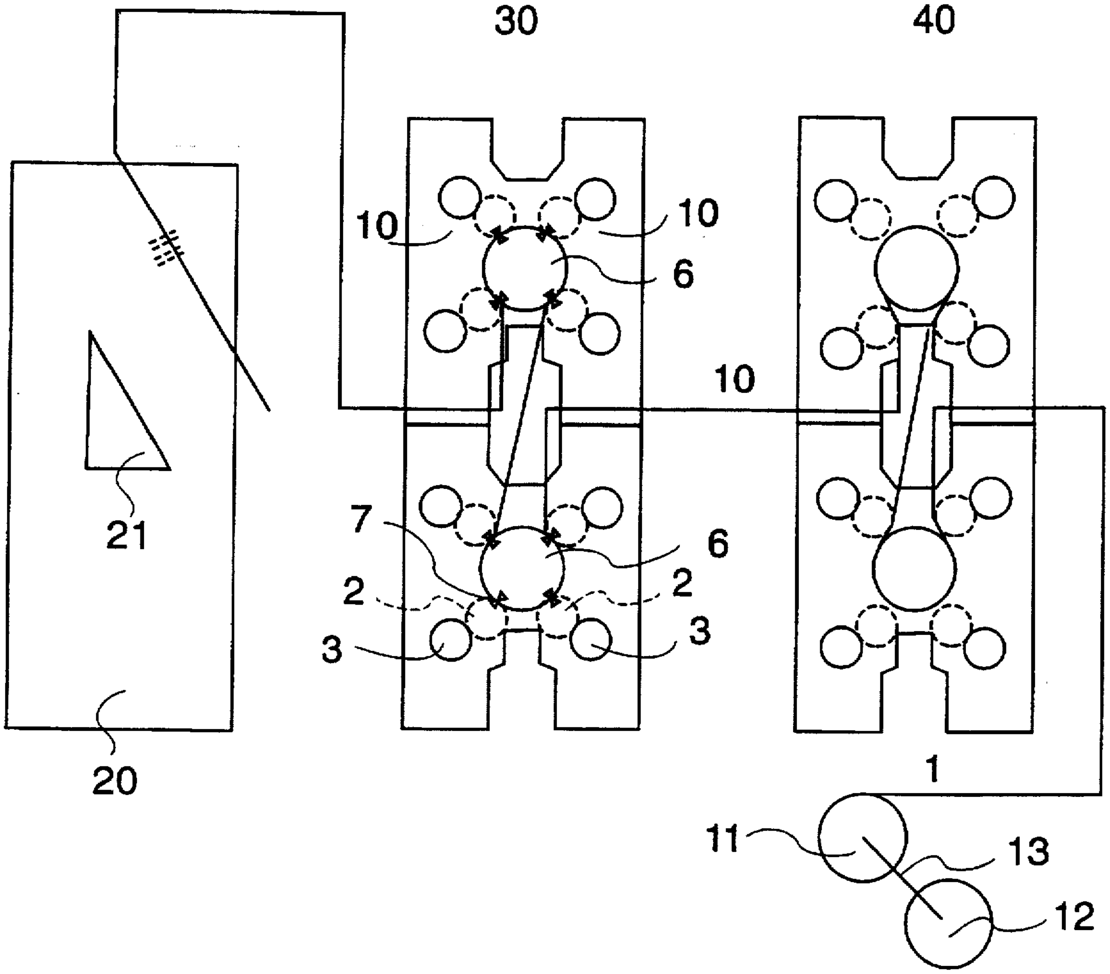
FIG. 3 is a schematic view of a printing press with printing towers, whose printing stations are formed by cylinder groups and central cylinders associated with them; [and]

FIG. 3 shows an alternative embodiment of a printing press, in which four directly driven cylinder groups 10 can be engaged with a central countercylinder 6. Two printing towers 30 and 40 with two cylinder units thus formed each are shown. The web 1 passes through both printing units of both printing towers 30 and 40 one after another, and then it enters the folder 20. All cylinder groups 10 of one printing tower 40 are pivoted away from the counterpressure cylinder 6 associated with them in this exemplary embodiment, while the cylinder groups 10 of the other printing tower 30 are in their printing position. At the time of a changeover in production, the printing tower 40 can correspondingly be put into operation, and the printing tower 30 can be put out of operation. All parameters, all inks and the printed contents can be changed due to the mirror-symmetrically identical design of the two printing towers 30 and 40. However, other operating positions, in which any cylinder groups 10 can be engaged, in principle, with the counterpressure cylinder 6 associated with them, are conceivable as well.

Figure 4:
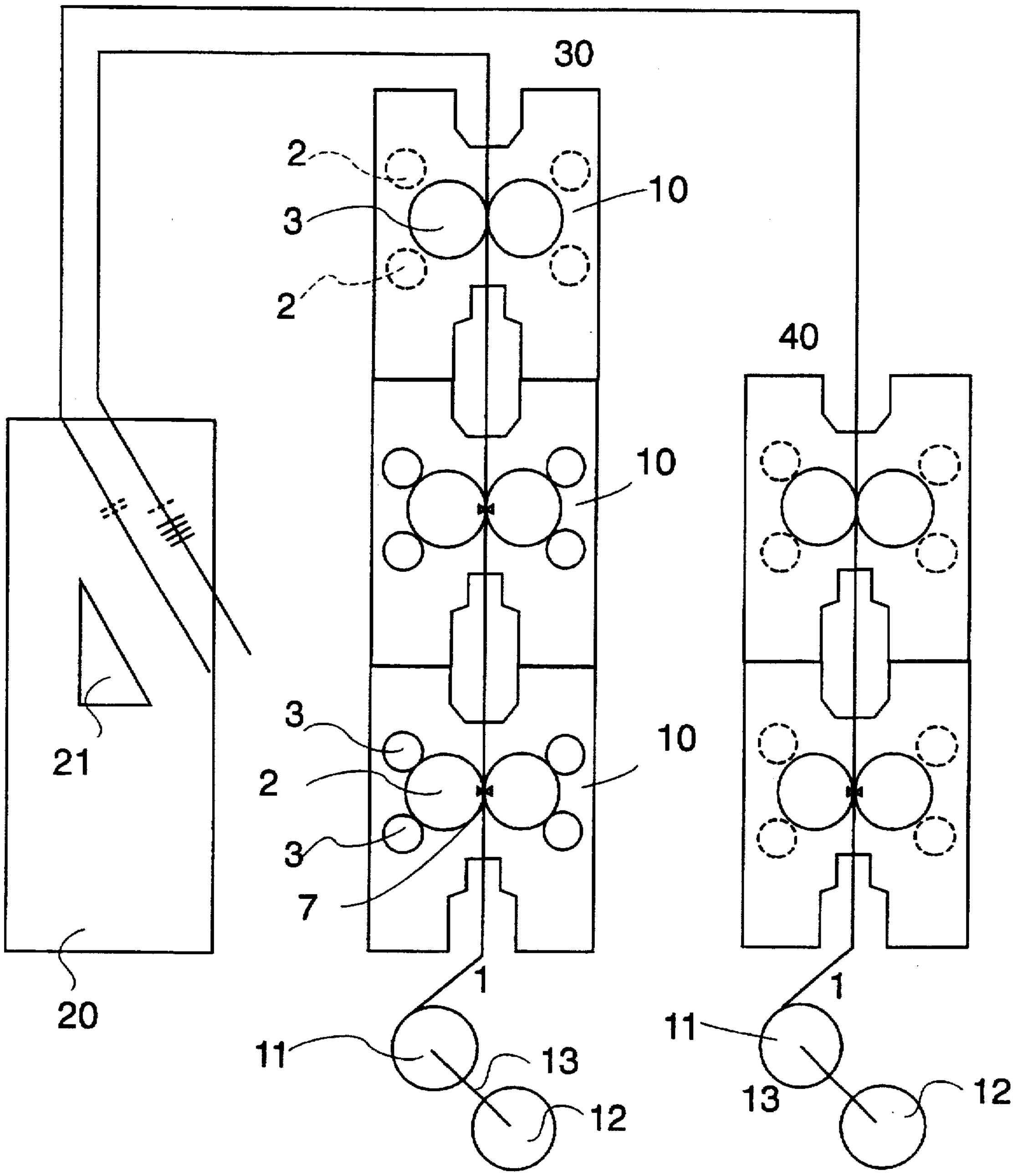
FIG. 4 is a schematic view of another printing press with printing towers, whose printing stations are formed by pairs of cylinder groups.

FIG. 4 shows another alternative for forming printing stations 7. One printing station 7 is formed by a pair of printing cylinders 2 of double thickness, which form a directly driven cylinder group 10 together with two plate cylinders 3 each associated with them. In the operating state shown, the two upper pairs of cylinder groups 10 of the two printing towers 30 and 40 are out of operation. The plate cylinders 3 are pivoted away from their printing cylinder 2 for this purpose in the exemplary embodiment.

To guarantee the NONSTOP production changeover, a double-width reel changer is suggested as shown in FIGS. **5*a*–8*b* and as known from U.S. Pat. 3,326,487, in which the corresponding central drives are dimensioned, on the one hand, for a defined limiting torque to protect the sleeves. Each reel changer can support an active current production reel 131 and a non active new production reel 132. The reels are supported on laterally displaceble support arms 134** which allow for different reel widths. On the other hand, it is necessary to take into account the circumstance that reel changers with split reel arms can accommodate maximum paper reel widths, but are more frequently provided with paper reels of reduced width. Based on the preset data, the reel changer now calculates the limiting reel diameter (GD) which can still be decelerated via the central drive based on the limiting torque and under emergency stop conditions.

Figure 6A:
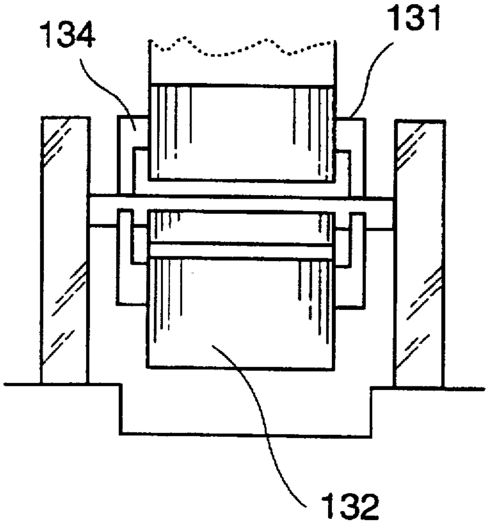
FIG. 6a (PRIOR ART)
FIG. 6*a* is a schematic front view of a roll changer with centered arrangement of paper rolls of equal roll width.
Figure 6B:
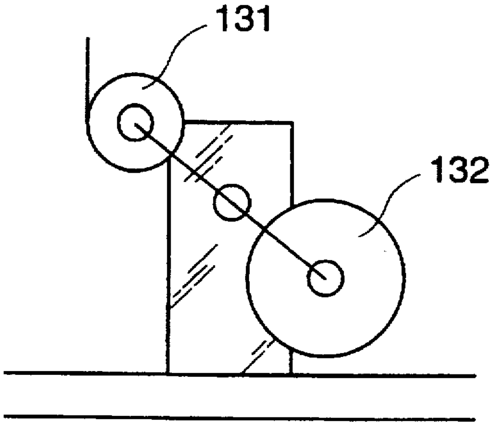
FIG. 6b (PRIOR ART)
FIG. 6*b* is a schematic side view of the roll changer of FIG. 6*a;*
Figure 7A:
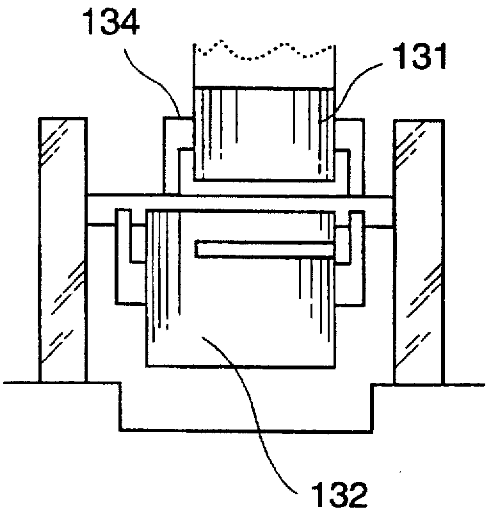
FIG. 7a (PRIOR ART)
FIG. 7*a* is a schematic front view of a roll changer with centered arrangement of paper rolls of unequal roll width, the rolls being laterally offset.
Figure 7B:
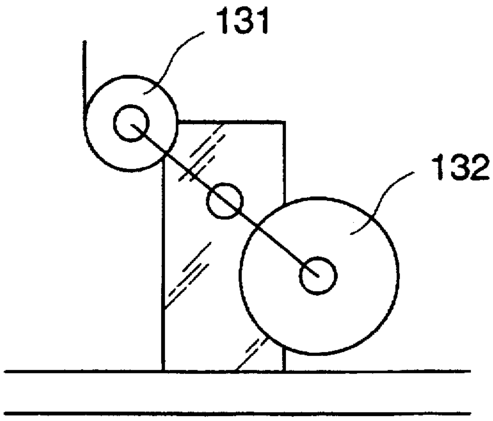
FIG. 7b (PRIOR ART)
FIG. 7*b* is a schematic side view of the roll changer of FIG. 7*a;*
Figure 8A:
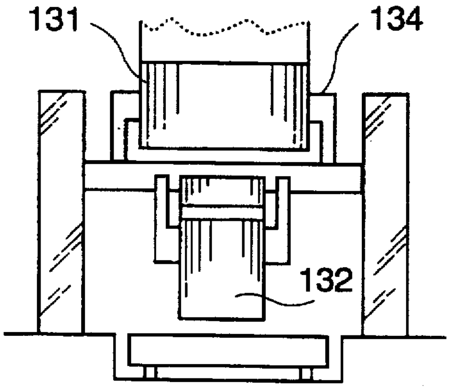
FIG. 8a (PRIOR ART)
FIG. 8*a* is a schematic front view of a roll changer with centered arrangement of paper rolls of unequal roll width.
Figure 8B:
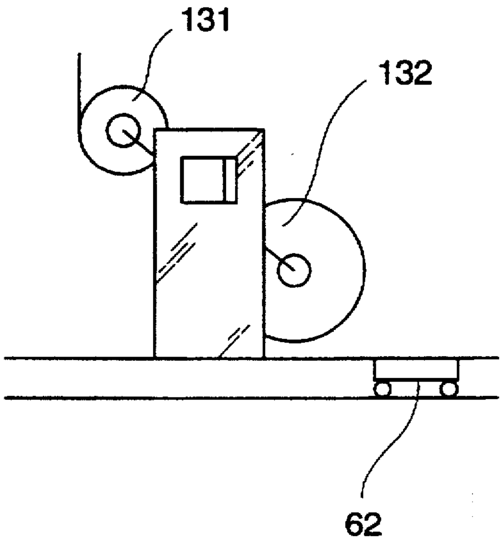
FIG. 8b (PRIOR ART)
FIG. 8*b* is a schematic side view of the roll changer of FIG. 8*a;*

Based on the difference between the desired value and the actual value of the size of the edition, the reel changer 13, changing centered reels of unequal length (FIG. **5*a* and 5*b*), changing centered reels of equal length (FIGS. 6*a* and 6*b*) or changing laterally offset reels (of different length as shown in FIGS. 7*a* and 7*b*** or of equal length) also calculates the amount of reel needed in running meters (consumption) already before, but also during the production, and it sends this demand to the automated paper reel processing unit, first before the beginning of the production, and then in an updated form. From the intermediate reel storage room, the automated paper reel processing unit brings in the paper reels which lead to an optimal residual reel diameter (RD) at the end of the production or at the time of a changeover of the production, taking into account a certain reserve.

The reel changer performs the production changeover as a flying change if the condition RD≦GD is met.

Even if the reel changer 13 is supplied via a simple manual transport system 62 (as shown in FIG. **8*b*) with moving reel platform, it is possible to state the amount of reels needed relative to the ongoing production (see FIG. 12**) in order for the paper reel running off ultimately having, at the time of the changeover of the production, a paper reel diameter that is smaller than the calculated limiting diameter for the central drive. The new reel width needed for the flying production changeover can be indicated as well.

Figure 9A:
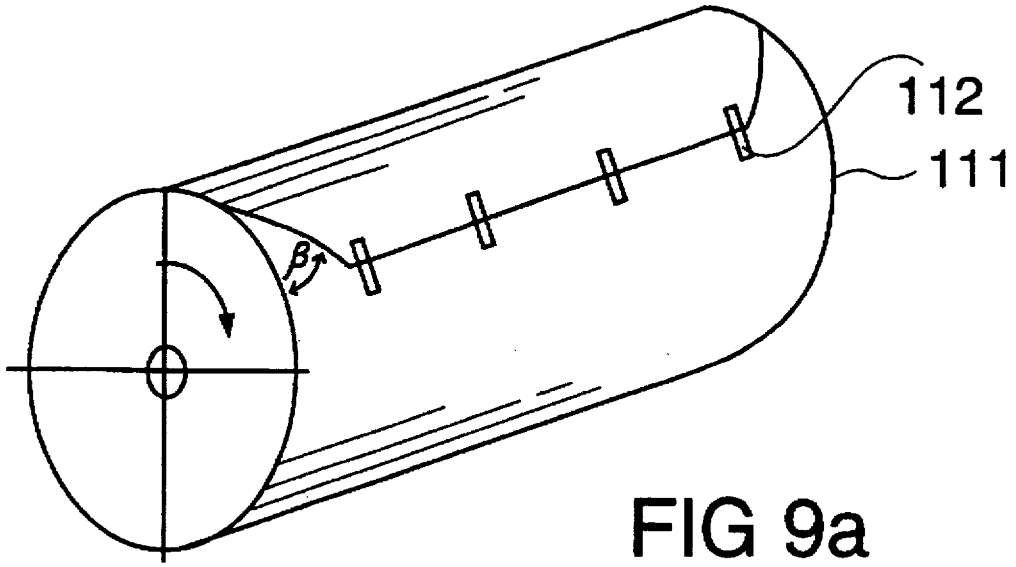
FIG. 9*a* is a schematic perspective view of a paper roll with different splices.
Figure 9B:
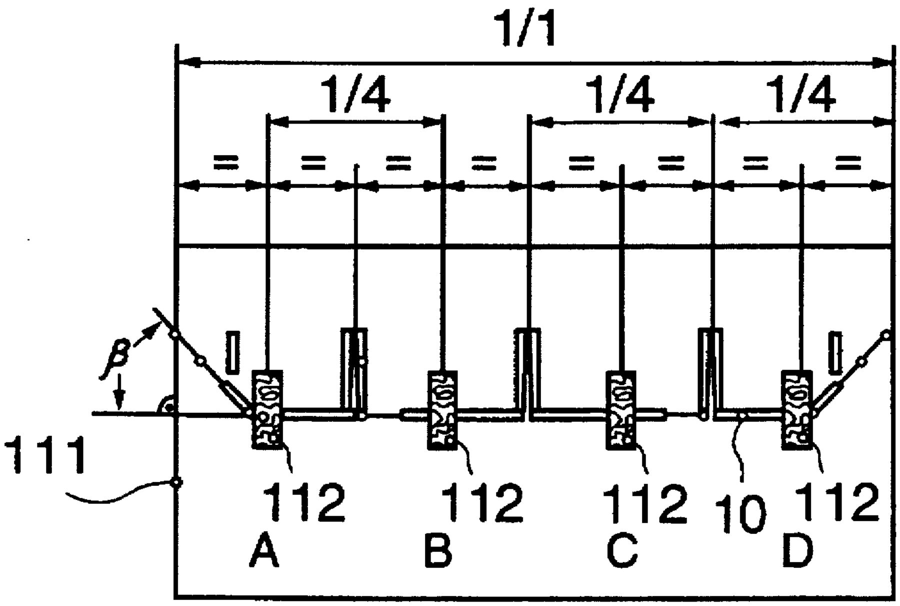
FIG. 9*b* is a schematic side view of the paper roll of FIG. 9*a;*
Figure 10:
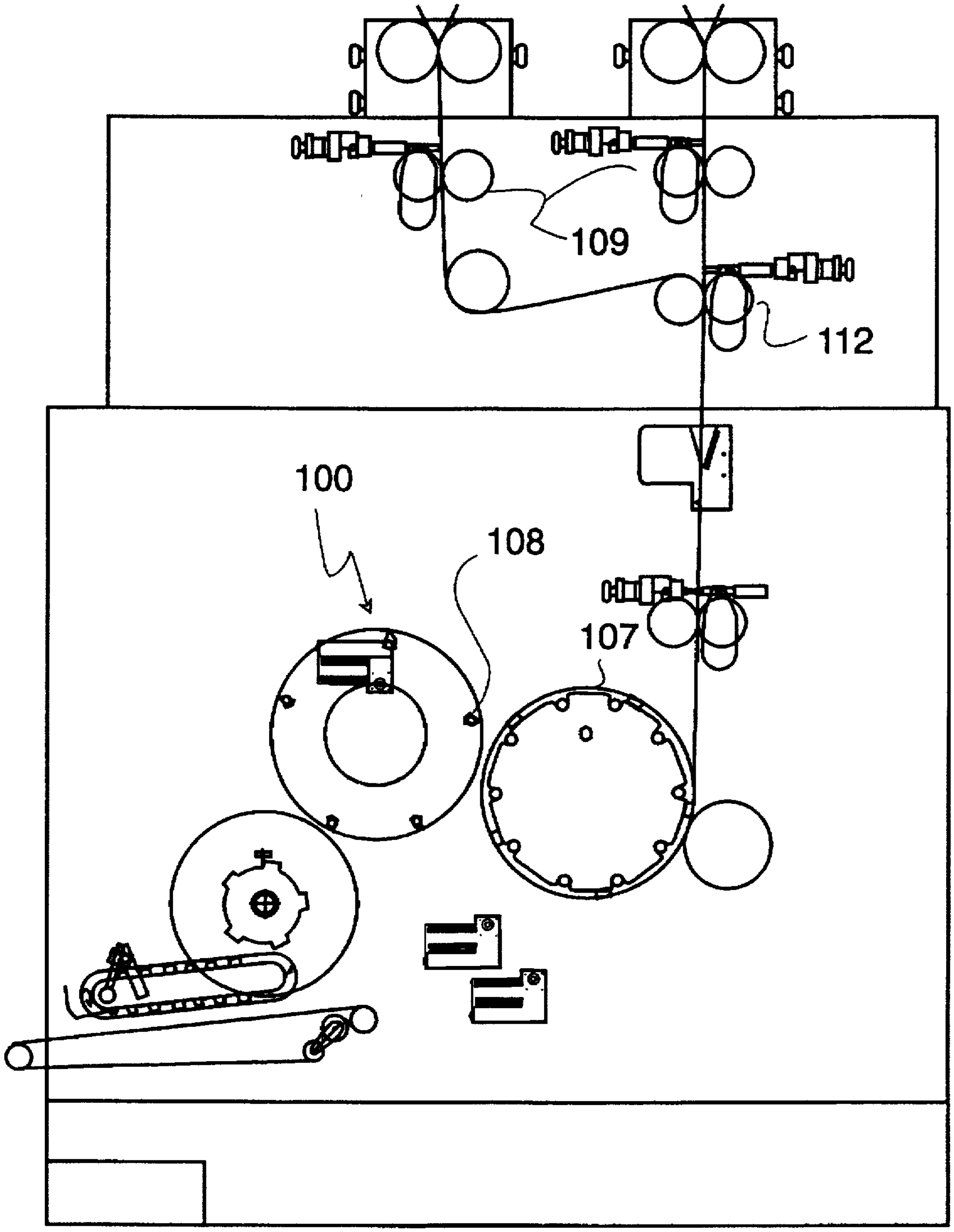
FIG. 10 is a schematic side view of a folding apparatus with components adjustable as a function of the circumference of the printed web.

A process and an adhesive 112 for preparing a splice point in a printing material web running off with the beginning of a replacement printing material web roll 111, which is already optimized and especially suitable for use in flying width change as can be seen in FIGS. **9*a* and 9*b*, a compatible arrangement is disclosed in unpublished German Patent Application No. P44 13 663. The advantage of the process described there for preparing a splice point is that the splice point is already divided into individual partial webs A, B, C and D, as shown in FIG. 9*b***, based on its design, and it is thus especially suitable for the automatic rebonding during the flying reel width change.

A folder 100 with components which are adjustable automatically during the production as a function of the number of printing material webs is especially suitable. These components are especially the adjustable folding jaw 108, the different engagement of the draw rollers 112, the overlay fold adjusting means 109, the expansion 107 of the collecting cylinder, as well as the adjustment of the point shift.

The design of a preferred control for the reel rotation for the NONSTOP production of different printed products is as follows:

production phase during run before the changeover, preparation phase during run, transition phase during run, activation phase during run, activation phase during run after the changeover.

The control supports a web-oriented web monitoring device, which can be changed over dynamically and makes it possible to change the web width or web position with the production description data records (old/new) per web. The changeover is accomplished such that each web in itself is never left without tear monitoring by section monitoring between the web monitoring members; only the web parts with the width of a single plate must be deactivated and reactivated in the run-off direction in a minimum time window. The change in the web width includes the possibility of pulling out entire webs during the run.

The control supports the simultaneous receipt of two production description data records (old/new) as well as two presetting data records (old/new) in order for the preparation phase, the transition phase and the activation phase of the production changeover to be supplied with the data associated therewith. The production changeover may affect a plurality of webs simultaneously.

The control supports the functions, automatism, conditions, displays and acknowledgements needed for the preparation phases, the transition phases, and the activation phases of the production changeover during the run.

The control supports reel change devices which are able to rebond webs of different widths or positions during the run. Cutting off without rebonding is also supported.

The control supports folding devices which are able to accept discontinuous changes in newspaper page numbers.

The control supports the switching on and off of printing couples (PCU) during the run.

The control supports the optionally automatic press speed adjustment, which is needed or desired for a certain production/production changeover.

Figure 12:
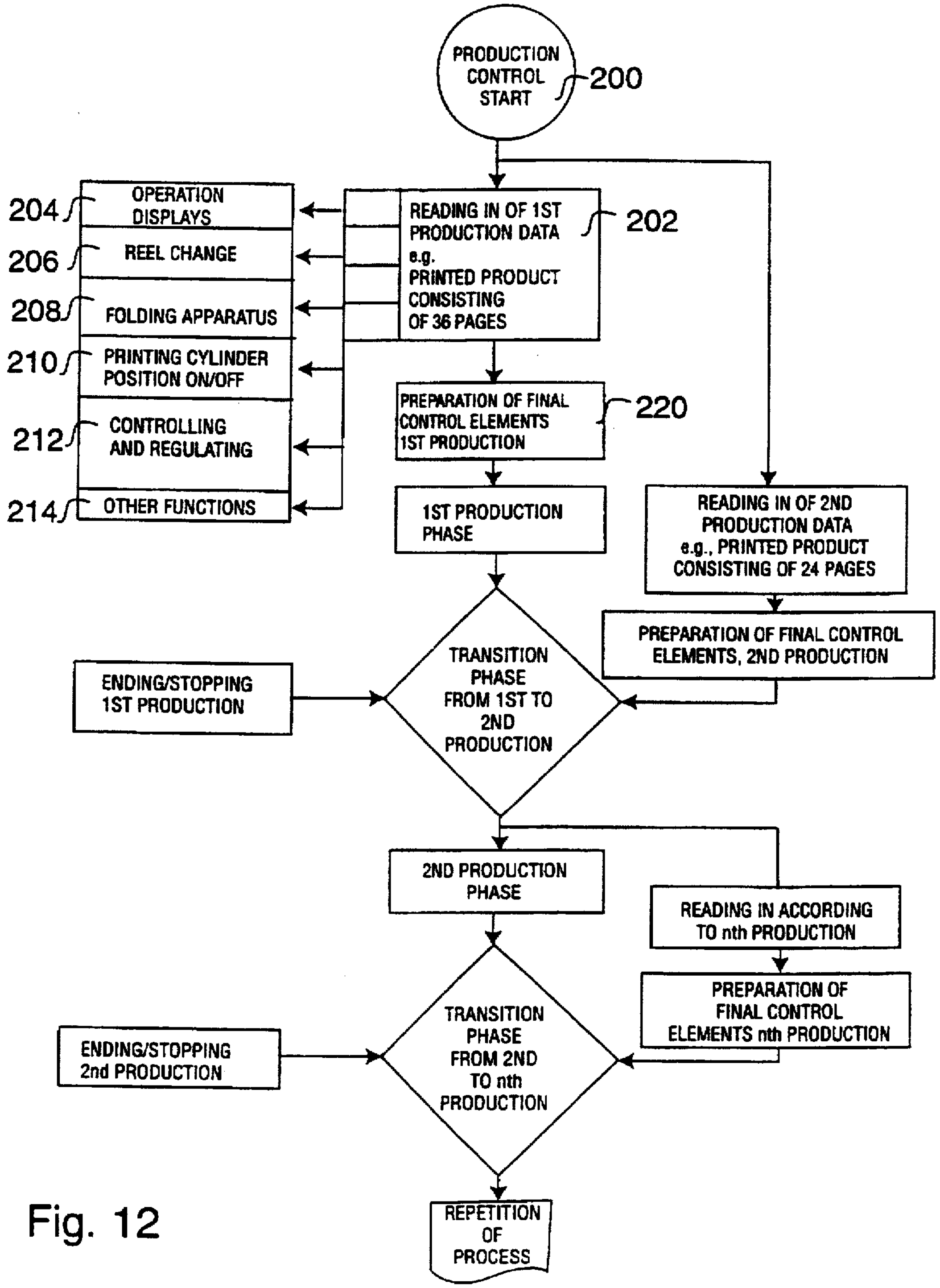
FIG. 12 is a block diagram of the nonstop production change according to the invention.

The control supports, e.g., the following operator-elicited or/and automated actions as shown in FIG. 12, after start up at 200, during the preparation phase of the production changeover during the run:

Data supply at 202, a reading in of data at function blocks 204–214, as shown in FIG. 12, of the different controls of the press parts, such as reel changer at 206, printing units 212, folding, control stations at 208, regulating such as speed and positioning systems at 212 and other functions 214 such as projection, auxiliary shops, ink and water supply systems, fan-out compensation devices, energy management and monitoring systems. This may be shown by reading the data into operations displays 204.

Washing, ink supply, plate installation, presetting and preinking of the printing couples, which are switched on during the transition phase.

Feeding of the corresponding reel changers with reels of the desired widths, positions and diameters, provided with the needed rebonding tips.

When needed, adaptation of the press speed to the production changeover or/and the subsequent production.

Speeding up and synchronization of the new reels, so that their circumferential velocities will be adapted to the velocities of the webs running off.

Replacement of the fan-out compensation and image regulation devices.

Switching off of the lateral edge position control devices.

Switch-off frequencies of the printing couples (PCU) no longer needed.

If needed, engagement during the operation of the longitudinal cutting devices which depend on the web width or/and web position and the newspaper structure.

Initiation of the production changeover phase during the run.

The control supports, e.g., the following operator-elicited or/and automated actions during the transition phase of the production changeover during the run:

Initiation of the rebonding processes in reel changers.

Initiation of the takeover of the change in the paper width or paper position, which takeover is sequential per we from the paper web run, from the paper web monitoring system.

Changeover of the final control elements of the folder during the run, which depend on the number of pages or/and the newspaper structure (e.g., intake rollers, jaw opening, overlay fold, expansion of the collecting cylinder, folding rollers, bucket wheel, point position, etc.).

Changeover of the final control elements of the web guide, which depend on the number of pages or/and the newspaper structure, e.g., the slope of the former, during the run.

Changeover during the run of the final control elements of the web pulling system, which depend on the web width or/and the web position or/and the paper grade, e.g., pretensioning mechanisms, extraction mechanisms, and other pulling devices.

Changeover of the fan-out compensation and image regulation devices.

Changeover of the lateral edge position control devices.

Initiation of the activation phase during the run.

The control supports, e.g., the following operator-elicited or/and automated actions during the activation phase of the production changeover during the run:

Switching on of the lateral edge position control devices.

Frequencies of deceleration of the changed reels on the reel changers.

Switch-on frequencies of the new printing couples (PCU) needed.

When needed, disengagement during the run of the longitudinal cutting devices, which depend on the web width or/and the web position and the newspaper structure.

Switching on of the fan-out compensation and image regulation control devices.

Engagement or disengagement of the no longer needed or newly needed web pressure rollers.

When needed, adjustment of the press speed to the new production.

Reporting that the status of the activation phase during the run has ended.

Figure 11A:
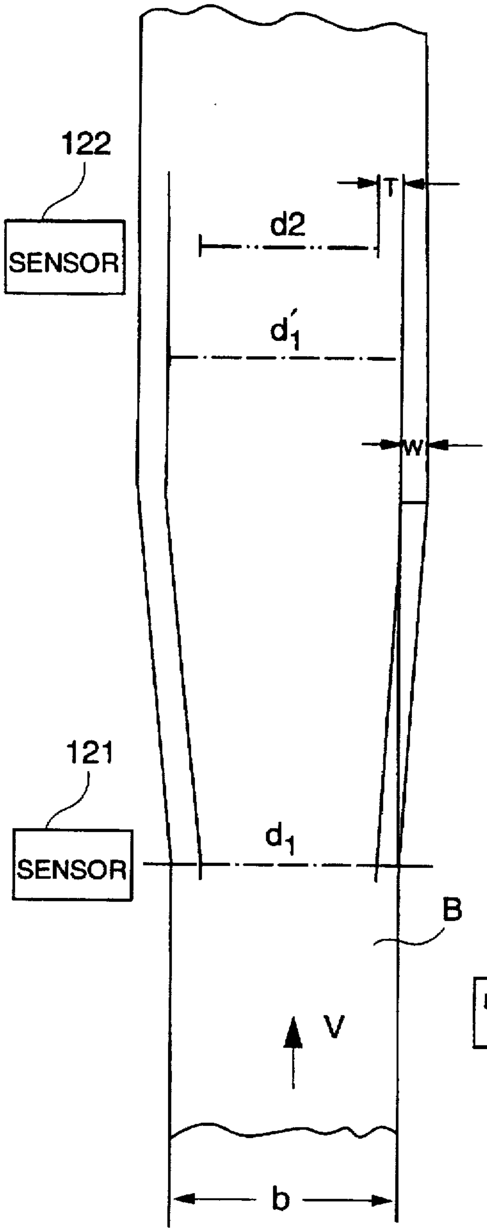
FIG. 11*a* is a schematic top view of a paper web without fanout compensation (change in web width)
Figure 11B:
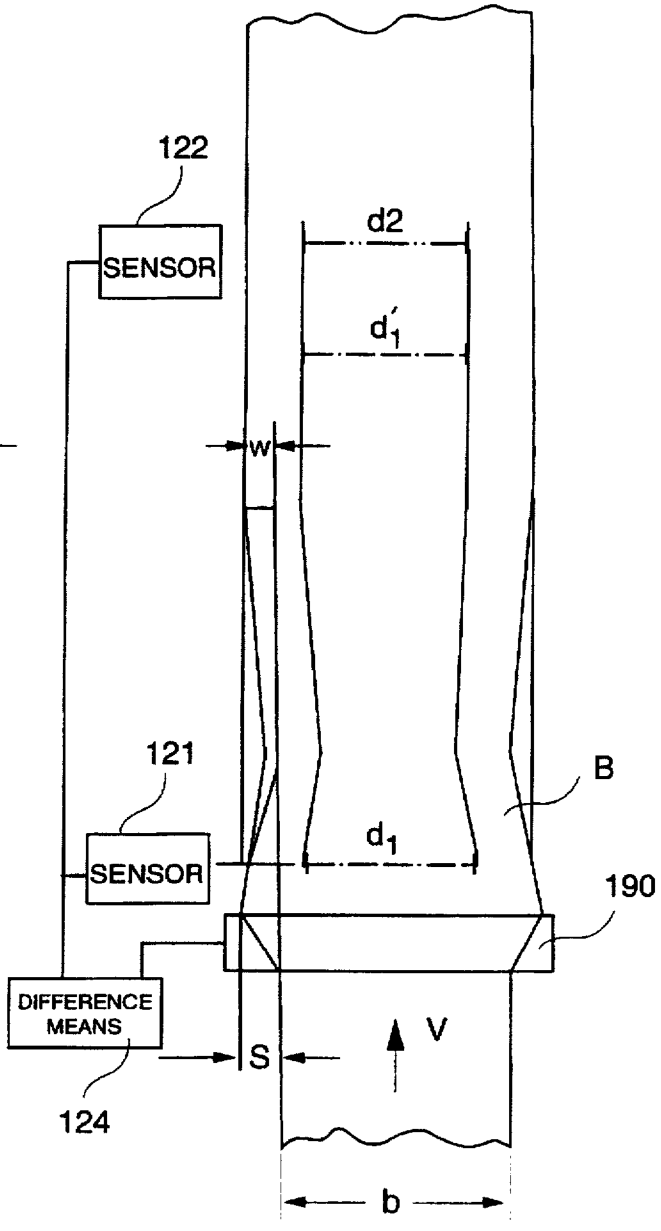
FIG. 11*b* is a schematic top view of a paper web with fanout compensation e.g., by means of a transverse guiding and stretching device (looping roller) or additional pulling members.

To prevent the FAN-OUT effect, which can occur with an arrangement as shown in FIG. 11*a* without fan out compensation, it is suggested that the change in the web width be determined at different points with suitable sensors 121 and 122, especially from one printing station to the next or at the inlet and the outlet of a printing unit. The difference r between the two values $d_1$ and $d_1'$ is formed at difference calculation means 124 and is used to form a signal for the corresponding web pull, which is set on the pretensioning mechanism and/or the extraction mechanism 190 for compensation.

In another solution for preventing the FAN-OUT effect during the production run, it is suggested that a web-looping roller 190, which is provided with a position transducer each, be arranged at both the inlet and the outlet of a printing unit. Due to the comparison of the phase positions of the two looping rollers, especially during a change in velocity, a value is again formed, which can be used to compensate the change in the web width by adjusting the pulling tension. Highly gripping, yet ink-repellent roller bodies made of carbon fiber-reinforced plastic are suitable for use as looping rollers.

The FAN-OUT effect is determined during printing by means of print marks suitably arranged on the printing material web or on the basis of the web edges or type area edges. The distances between the print marks—in the longitudinal direction and possibly also in the transverse direction—are continuously determined and compared with the desired values to determine a compensation signal. Depending on the deviation of the data determined, the desired value of the web tension is adjusted at the pull-in mechanism, taking into account web tension limit values. The desired velocity values of additional pulling members along the path of the web are optionally compared.

While specific embodiments of the invention have been shown and described in detail to illustrate the application of the principles of the invention, it will be understood that the invention may be embodied otherwise without departing from such principles.

What is claimed is:

1. A web-fed rotary press, comprising:

an adjustable reel changer for accommodating printing material webs of different widths;

cylinder pairs, each of said cylinder pairs including a printing cylinder and a plate cylinder and including means for changing a position of said printing cylinder from an inactive position to an engaged position with said printing cylinder engaging one of another printing cylinder and a counter cylinder to form a printing couple, each printing couple forming a printing station whereby a plurality of printing stations are provided;

an adjustable folder; and automatic adjustment means for adjusting the width of said reel changer, for adjusting the position of at least one said printing cylinder to change the state of at least one printing couple from engaged to inactive or from inactive to engaged and changing components of the said folder automatically and in a mutually coordinated manner during the run of the press to change over the production from a first printed product to a second printed product.

2. A web-fed rotary press in accordance with claim 1, wherein said adjustment means acts as a function of the number of pages and/or of the page content and/or the arrangement of the pages, which have changed from the first printed product to the second one.

3. The web-fed rotary printing press in accordance with claim 1, wherein the printing material web is passed through more printing stations than are necessary for a production.

4. The web-fed rotary press in accordance with claim 1, wherein said cylinder pairs are integrated into cylinder groups by mechanical coupling for driving, and each cylinder group is driven by a separate drive motor.

5. The web-fed rotary printing press in accordance with claim 4, wherein that to change the production with said printing material web passing continuously through the printing stations, individual said cylinder groups are engaged and other said cylinder groups are disengaged individually or together.

6. The web-fed rotary printing press in accordance with claim 4, wherein a plurality of said directly driven cylinder groups are engaged, individually or together, with a common counterpressure cylinder, forming a printing station.

7. The web-fed rotary printing press in accordance with claim 6, wherein said counterpressure cylinder is provided with a separate drive motor.

8. The web-fed rotary printing press in accordance with claim 4, wherein a plurality of such cylinder groups are associated with two central cylinders, which are provided with a said separate drive motor each.

9. The web-fed rotary press in accordance with claim 4, wherein said printing cylinder of said cylinder group is twice as large as each of said two plate cylinders associated with it, and wherein said plate cylinders are engagable with or disengaged from said printing cylinder individually or together.

10. The web-fed rotary printing press in accordance with claim 4, wherein said printing cylinders of two said directly driven cylinder groups can be engaged with one another, forming a printing station.

11. The web-fed rotary press in accordance with claim 1, wherein said components of said adjustable folder include at least one of a folding jaw opening, draw rollers, an overlay fold adjusting means and an expansion of a collecting cylinder, said components being adjustable as a function of the changed number of pages of the printed product.

12. The web-fed rotary printing press in accordance with claim 4, wherein said cylinder groups are arranged alternating between u-shaped and n-shaped printing stations arranged one above the other.

13. The web-fed rotary printing press in accordance with claim 4, wherein said cylinder groups form at least a 10-cylinder or 12-cylinder printing tower.

14. The web-fed rotary printing press in accordance with claim 1, further comprising FAN-OUT effect prevention means, including sensor means for detecting a change in the web width at different points, especially from one printing station to the next, or at the inlet and the outlet of a printing unit, and means for determining a difference between values at the different points and generating a signal for compensating the pulling of the web.

15. The web-fed rotary printing press in accordance with claim 14, wherein one web looping roller each is arranged at both the inlet and the outlet of a printing unit, and said web looping rollers are provided with a position transducer each, whose values are used to form a signal for compensating the pulling of the web.

16. The web-fed rotary printing press in accordance with claim 14, wherein the FAN-OUT effect prevention means includes print marks arranged on the printing material web or on the basis of the web edges or printing area edges.

17. A rotary offset printing press comprising:

an adjustable reel changer capable of taking up a plurality of webs with different widths;

a plurality of printing cylinders movable into contact with one another in printing areas to form printing groups;

a plurality of plate cylinders, each of said plurality of printing cylinders being mechanically coupled with one of said plurality of plate cylinders;

a plurality of drive means, each of said plurality of drive means separately driving a different one of said plurality of printing cylinders mechanically independently from other of said printing cylinders;

adjustable folder means for receiving the webs from said printing cylinders;

control means for automatically adjusting a width of said adjustable reel changer, for adjusting a position of said printing cylinders, and for adjusting components of said adjustable folder means in a mutually coordinated manner to change over production from a first printed product to second printed product during operation of the rotary offset printing press.

18. The web-fed rotary printing press in accordance with claim 17, wherein the printing material web is passed through more of said printing group than are necessary for a production, said printing cylinders of said printing groups being moveable between an engaged position and an inactive position whereby said adjusting of a position of said printing cylinders includes adjusting some of said printing to said inactive position and adjusting some of said printing cylinders to said engaged position.

* * * * *